(12) United States Patent
Zadeh et al.

(10) Patent No.: US 9,904,436 B2
(45) Date of Patent: Feb. 27, 2018

(54) METHOD AND APPARATUS FOR CREATING A PERSONALIZED QUESTION FEED PLATFORM

(71) Applicant: Pearl.com LLC, San Francisco, CA (US)

(72) Inventors: Ashkan Gholam Zadeh, San Francisco, CA (US); Gann Bierner, Oakland, CA (US)

(73) Assignee: PEARL.COM LLC, San Francisco, CA (US)

( * ) Notice: Subject to any disclaimer, the term of this patent is extended or adjusted under 35 U.S.C. 154(b) by 786 days.

(21) Appl. No.: 13/946,984

(22) Filed: Jul. 19, 2013

(65) Prior Publication Data

US 2013/0311903 A1 Nov. 21, 2013

Related U.S. Application Data

(63) Continuation-in-part of application No. 12/854,846, filed on Aug. 11, 2010, now abandoned, and a continuation-in-part of application No. 12/854,838, filed on Aug. 11, 2010, now abandoned, and a continuation-in-part of application No. 13/439,743,
(Continued)

(51) Int. Cl.
| | | |
|---|---|---|
| *G06F 3/0482* | (2013.01) | |
| *G06Q 40/00* | (2012.01) | |
| *G06Q 10/10* | (2012.01) | |
| *G06Q 30/00* | (2012.01) | |
| *G06Q 30/02* | (2012.01) | |
| *G06Q 50/00* | (2012.01) | |

(Continued)

(52) U.S. Cl.
CPC .......... *G06F 3/0482* (2013.01); *G06Q 10/10* (2013.01); *G06Q 30/0185* (2013.01); *G06Q 30/0206* (2013.01); *G06Q 30/0207* (2013.01); *G06Q 30/0283* (2013.01); *G06Q 40/12* (2013.12); *G06Q 50/01* (2013.01); *H04M 3/493* (2013.01); *H04M 3/51* (2013.01)

(58) Field of Classification Search
None
See application file for complete search history.

(56) References Cited

U.S. PATENT DOCUMENTS

| | | | |
|---|---|---|---|
| 5,384,703 A | 1/1995 | Withgott et al. | |
| 5,566,302 A | 10/1996 | Khalidi et al. | |

(Continued)

FOREIGN PATENT DOCUMENTS

| | | |
|---|---|---|
| CN | 101320374 A | 12/2008 |
| JP | 2004086583 A | 3/2004 |

(Continued)

OTHER PUBLICATIONS

Non-Final Office Action from U.S. Appl. No. 13/464,230, dated Jul. 9, 2015.

(Continued)

*Primary Examiner* — Ryan Zeender
*Assistant Examiner* — Denisse Ortiz Roman
(74) *Attorney, Agent, or Firm* — Zilka-Kotab, P.C.

(57) ABSTRACT

Embodiments of the present invention further provide systems and methods for allowing users in an online consultation system to create, edit and follow information feeds related to a subject matter category, topic, person or a combination thereof.

9 Claims, 11 Drawing Sheets

Related U.S. Application Data filed on Apr. 4, 2012, now abandoned, which is a continuation of application No. 12/854,849, filed on Aug. 11, 2010, now abandoned, application No. 13/946,984, which is a continuation-in-part of application No. 13/464,230, filed on May 4, 2012, now Pat. No. 9,646,079.

(60) Provisional application No. 61/233,046, filed on Aug. 11, 2009.

(51) Int. Cl.
  *H04M 3/493* (2006.01)
  *H04M 3/51* (2006.01)

(56) References Cited

U.S. PATENT DOCUMENTS

| | | |
|---|---|---|
| 5,642,520 A | 6/1997 | Takeshita et al. |
| 5,918,240 A | 6/1999 | Kupiec et al. |
| 5,937,422 A | 8/1999 | Nelson et al. |
| 5,960,383 A | 9/1999 | Fleischer |
| 6,018,543 A | 1/2000 | Blois et al. |
| 6,029,195 A | 2/2000 | Herz |
| 6,144,672 A | 11/2000 | Brauner |
| 6,172,675 B1 | 1/2001 | Ahmad et al. |
| 6,173,279 B1 | 1/2001 | Levin et al. |
| 6,212,494 B1 | 4/2001 | Boguraev |
| 6,223,165 B1 | 4/2001 | Lauffer |
| 6,289,304 B1 | 9/2001 | Grefenstette |
| 6,629,097 B1 | 9/2003 | Keith |
| 6,638,317 B2 | 10/2003 | Nakao |
| 6,754,654 B1 | 6/2004 | Kim et al. |
| 6,823,325 B1 | 11/2004 | Davies et al. |
| 6,871,199 B1 | 3/2005 | Binnig et al. |
| 6,963,830 B1 | 11/2005 | Nakao |
| 7,013,325 B1 | 3/2006 | Vivian et al. |
| 7,058,626 B1 | 6/2006 | Pan et al. |
| 7,146,128 B2 | 12/2006 | Okubo |
| 7,146,358 B1 | 12/2006 | Gravano et al. |
| 7,200,808 B1 | 4/2007 | Nagao |
| 7,209,908 B2 | 4/2007 | Li et al. |
| 7,289,982 B2 | 10/2007 | Saito et al. |
| 7,376,893 B2 | 5/2008 | Chen et al. |
| 7,454,393 B2 | 11/2008 | Horvitz et al. |
| 7,516,113 B2 | 4/2009 | Horvitz et al. |
| 7,672,831 B2 | 3/2010 | Todhunter et al. |
| 7,739,215 B2 | 6/2010 | Horvitz et al. |
| 7,783,622 B1 | 8/2010 | Vandermolen et al. |
| 7,831,688 B2 | 11/2010 | Linyard et al. |
| 7,962,326 B2 | 6/2011 | Tsourikov et al. |
| 8,005,665 B2 | 8/2011 | Chaney et al. |
| 8,046,472 B2 | 10/2011 | Kumar |
| 8,150,750 B2 | 4/2012 | Ray |
| 8,250,018 B2 | 8/2012 | Wong et al. |
| 8,280,888 B1 | 10/2012 | Bierner et al. |
| 8,332,394 B2 | 12/2012 | Fan et al. |
| 8,392,360 B1 | 3/2013 | Dicker et al. |
| 8,457,979 B2 | 6/2013 | Kurtzig et al. |
| 8,463,648 B1 | 6/2013 | Bierner et al. |
| 8,463,791 B1 | 6/2013 | Bierner et al. |
| 8,473,499 B2 | 6/2013 | Song et al. |
| 8,516,077 B2 | 8/2013 | Linyard et al. |
| 8,606,739 B2 | 12/2013 | Apacible et al. |
| 8,655,866 B1 | 2/2014 | Provine et al. |
| 8,732,222 B2 | 5/2014 | Horvitz et al. |
| 8,738,617 B2 | 5/2014 | Brown et al. |
| 8,954,358 B1 | 2/2015 | Zhang et al. |
| 9,275,038 B2 | 3/2016 | Bierner et al. |
| 2001/0021934 A1 | 9/2001 | Yokoi |
| 2002/0010574 A1 | 1/2002 | Tsourikov et al. |
| 2002/0023144 A1 | 2/2002 | Linyard et al. |
| 2002/0065857 A1 | 5/2002 | Michalewicz et al. |
| 2002/0087314 A1 | 7/2002 | Fischer et al. |
| 2002/0087496 A1* | 7/2002 | Stirpe .................. G06Q 30/02 706/45 |
| 2002/0116176 A1 | 8/2002 | Tsourikov et al. |
| 2002/0184206 A1 | 12/2002 | Evans |
| 2003/0028525 A1 | 2/2003 | Santos et al. |
| 2003/0130837 A1 | 7/2003 | Batchilo et al. |
| 2003/0140037 A1 | 7/2003 | Deh-Lee |
| 2003/0144895 A1 | 7/2003 | Aksu et al. |
| 2003/0172368 A1 | 9/2003 | Alumbaugh et al. |
| 2003/0200079 A1 | 10/2003 | Sakai |
| 2004/0006560 A1 | 1/2004 | Chan et al. |
| 2004/0049499 A1 | 3/2004 | Nomoto et al. |
| 2004/0083224 A1 | 4/2004 | Yoshida |
| 2004/0158337 A1 | 8/2004 | Forest |
| 2004/0205448 A1 | 10/2004 | Grefenstette et al. |
| 2005/0055231 A1 | 3/2005 | Lee |
| 2005/0086290 A1 | 4/2005 | Joyce et al. |
| 2005/0131874 A1 | 6/2005 | Verbitsky |
| 2005/0182743 A1 | 8/2005 | Koenig |
| 2005/0266387 A1 | 12/2005 | Rossides |
| 2005/0278314 A1 | 12/2005 | Buchheit |
| 2006/0036563 A1 | 2/2006 | Wu |
| 2006/0041424 A1 | 2/2006 | Todhunter et al. |
| 2006/0106788 A1 | 5/2006 | Forrest |
| 2006/0149555 A1 | 7/2006 | Fabbrizio et al. |
| 2006/0167864 A1 | 7/2006 | Bailey et al. |
| 2006/0287970 A1 | 12/2006 | Chess et al. |
| 2006/0294037 A1 | 12/2006 | Horvitz et al. |
| 2007/0005564 A1 | 1/2007 | Zehner |
| 2007/0022109 A1 | 1/2007 | Imielinski et al. |
| 2007/0094006 A1 | 4/2007 | Todhunter et al. |
| 2007/0124266 A1 | 5/2007 | Hearing et al. |
| 2007/0143238 A1 | 6/2007 | Kochunni et al. |
| 2007/0160970 A1 | 7/2007 | Kaplan |
| 2007/0203863 A1 | 8/2007 | Gupta et al. |
| 2007/0239874 A1 | 10/2007 | Lazaridis et al. |
| 2007/0271256 A1 | 11/2007 | Chang et al. |
| 2008/0027783 A1 | 1/2008 | Hughes et al. |
| 2008/0064018 A1 | 3/2008 | Griffin |
| 2008/0077054 A1 | 3/2008 | Feuer et al. |
| 2008/0126280 A1 | 5/2008 | Liu et al. |
| 2008/0147741 A1 | 6/2008 | Gonen et al. |
| 2008/0160490 A1* | 7/2008 | Gomes .................. G09B 7/02 434/350 |
| 2008/0215976 A1 | 9/2008 | Bierner et al. |
| 2008/0243539 A1 | 10/2008 | Barish et al. |
| 2008/0270169 A1 | 10/2008 | Kibar et al. |
| 2008/0311934 A1 | 12/2008 | Soderstrom |
| 2009/0055384 A1 | 2/2009 | Jain et al. |
| 2009/0063463 A1 | 3/2009 | Turner et al. |
| 2009/0112912 A1 | 4/2009 | Schimmel et al. |
| 2009/0162824 A1 | 6/2009 | Heck |
| 2009/0177529 A1 | 7/2009 | Hadi |
| 2009/0192966 A1 | 7/2009 | Horvitz et al. |
| 2009/0204426 A1 | 8/2009 | Thorne et al. |
| 2009/0276419 A1 | 11/2009 | Jones et al. |
| 2010/0048229 A1 | 2/2010 | Rizzi |
| 2010/0057569 A1 | 3/2010 | Cantelmo et al. |
| 2010/0161785 A1 | 6/2010 | Xue et al. |
| 2010/0191686 A1 | 7/2010 | Wang et al. |
| 2010/0217603 A1 | 8/2010 | Hammond et al. |
| 2010/0235311 A1 | 9/2010 | Cao et al. |
| 2011/0004588 A1 | 1/2011 | Leitersdorf et al. |
| 2011/0040592 A1 | 2/2011 | Kurtzig et al. |
| 2011/0040662 A1 | 2/2011 | Kurtzig |
| 2011/0040694 A1 | 2/2011 | Kurtzig et al. |
| 2011/0041173 A1 | 2/2011 | Kurtzig et al. |
| 2011/0078167 A1 | 3/2011 | Sundaresan et al. |
| 2011/0131210 A1 | 6/2011 | Bierner |
| 2011/0131283 A1 | 6/2011 | Canning et al. |
| 2012/0095978 A1 | 4/2012 | Levin et al. |
| 2012/0116844 A1 | 5/2012 | Menich et al. |
| 2012/0130910 A1 | 5/2012 | Al-Alami |
| 2012/0131033 A1 | 5/2012 | Bierner |
| 2012/0185888 A1 | 7/2012 | Eyer et al. |
| 2012/0197813 A1 | 8/2012 | Kurtzig et al. |
| 2012/0197820 A1 | 8/2012 | Kurtzig et al. |
| 2012/0303356 A1 | 11/2012 | Boyle et al. |
| 2013/0041921 A1 | 2/2013 | Cooper et al. |

(56) References Cited

U.S. PATENT DOCUMENTS

| | | |
|---|---|---|
| 2013/0124532 A1 | 5/2013 | McQuarrie |
| 2013/0132308 A1 | 5/2013 | Boss et al. |
| 2013/0151236 A1 | 6/2013 | Iofinov |
| 2013/0166282 A1 | 6/2013 | Ridge et al. |
| 2013/0254153 A1 | 9/2013 | Marcheret |
| 2013/0268319 A1 | 10/2013 | Palombo |
| 2013/0290225 A1 | 10/2013 | Kamath et al. |
| 2013/0290342 A1 | 10/2013 | Cooper et al. |
| 2013/0295546 A1 | 11/2013 | Bierner et al. |
| 2013/0297545 A1 | 11/2013 | Bierner et al. |
| 2013/0297553 A1 | 11/2013 | Bierner |
| 2013/0297625 A1 | 11/2013 | Bierner et al. |
| 2013/0304749 A1 | 11/2013 | Cooper |
| 2013/0311476 A1 | 11/2013 | Bierner |
| 2014/0003652 A1 | 1/2014 | Fedorovskaya et al. |
| 2014/0074826 A1 | 3/2014 | Cooper et al. |
| 2014/0114986 A1 | 4/2014 | Bierner |
| 2014/0120513 A1 | 5/2014 | Jenkins et al. |
| 2014/0136567 A1 | 5/2014 | Bhalotia |
| 2014/0156365 A1 | 6/2014 | Porter et al. |

FOREIGN PATENT DOCUMENTS

| | | |
|---|---|---|
| WO | 2008077054 A1 | 6/2008 |
| WO | 2011019852 A1 | 2/2011 |

OTHER PUBLICATIONS

Final Office Action from U.S. Appl. No. 13/464,269, dated Aug. 11, 2015.
Final Office Action from U.S. Appl. No. 13/464,287, dated Aug. 10, 2015.
Non-Final Office Action from U.S. Appl. No. 13/946,982, dated Jun. 29, 2015.
Sferra, "Customer Service Webpage" http://www.sferra.com/content/100/customer-service.html, Oct. 10, 2011, pp. 1-4.
Sears Brands LLC, "Customer Service Webpage" http://www.sears.com/shc/s/nb_10153_12605_NB_CSHome, Mar. 14, 2012, pp. 1-2.
Notice of Allowance from U.S. Appl. No. 13/464,287, dated Oct. 19, 2015.
Non-Final Office Action from U.S. Appl. No. 13/946,989, dated Jan. 21, 2016.
Final Office Action from U.S. Appl. No. 13/464,230, dated Jan. 14, 2016.
Notice of Allowance from U.S. Appl. No. 13/946,989, dated Jul. 27, 2016.
Schonhofen, P., "Identifying document topics using the Wikipedia category network," Web Intelligence and Agent Systems: An International Journal 7.2, 2009, 8 pages.
Bischoff et al., "Can All Tags be Used for Search?" Proceedings of the 17th ACM conference on Information and knowledge management, ACM, 2008, pp. 203-212.
Anick et al., "The Paraphrase Search Assistant: Terminological Feedback for Iterative Information Seeking," Proceedings of the 22nd annual international ACM SIGIR conference on Research and development in information retrieval, ACM, 1999, pp. 153-161.
Yang et al., "Analyzing and Predicting Not-Answered Questions in Community-Based Question Answering Services," Proceedings of the Twenty-Fifth AAAI Conference on Artificial Intelligence, 2011, pp. 1273-1278.
Raben, D.R., "Self-Presentation and the Value of Information in Q&A Websites," Wiley INterscience, Aug. 7 2009, pp. 2465-2473.
Liu et al., "You've got answers: Towards personalized models for predictingsuccess in community question answering," In Proceedings of the 46th Annual Meeting of the Association for Computational Linguistics (ACL), 2008, pp. 97-100.
Dror et al., "Will My Question be Answered? Predictiong "Question-Answerability" in Community Question Answering Sites," Yahoo Labs, 2013, pp. 1-16.
Broder et al., "Syntatic Clustering of the Web," SRC Technical Note, Jul. 25, 1997, pp. 1-13.
Gharehchopogh et al., "Machine Learing based Question Classification Methods in Question Answering Systems," International Journal of Innovation and Applied Studies, vol. 4, No. 2, Oct. 2013, pp. 264-273.
Wei, L., "Question Classificaiton Using Language Modeling," CIIR Technical Report: University of Massachusetts, 2002, pp. 1-7.
Zhang et al., "Question Classification using Support Vector Machines", SIGIR, 2003, pp. 1-7.
Hermajakob, U., "Parsing and Question Classification for Question Answering", 2001, Proceedings of the Workshop on Open-Domain Question Answering at ACL, pp. 1-6.
Radev et al., "Probabilistic Question Answering on the Web," 2002, pp. 408-419.
Bierner et al., U.S. Appl. No. 13/946,982, filed Jul. 19, 2013.
Non-Final Office Action from U.S. Appl. No. 13/946,982, dated Jul. 15, 2014.
Final Office Action from U.S. Appl. No. 13/946,982, dated Dec. 8, 2014.
Advisory Action from U.S. Appl. No. 13/946,982, dated Mar. 23, 2015.
Final Office Action from U.S. Appl. No. 12/854,838, dated Mar. 20, 2015.
Final Office Action from U.S. Appl. No. 12/854,846, dated Apr. 7, 2015.
Kurtzig, A. P., U.S. Appl. No. 12/854,846, filed Aug. 11, 2010.
Non-Final Office Action from U.S. Appl. No. 12/854,846, dated Oct. 11, 2011.
Final Office Action from U.S. Appl. No. 12/854,846, dated Jun. 6, 2012.
Advisory Action from U.S. Appl. No. 12/854,846, dated Aug. 30, 2012.
Non-Final Office Action from U.S. Appl. No. 12/854,846, dated Dec. 18, 2014.
Kurtzig et al., U.S. Appl. No. 12/854,838, filed Aug. 11, 2010.
Non-Final Office Action from U.S. Appl. No. 12/854,838, dated Feb. 15, 2012.
Final Office Action from U.S. Appl. No. 12/854,838, dated Jul. 20, 2012.
Non-Final Office Action from U.S. Appl. No. 12/854,838, dated Oct. 2, 2014.
Kurtzig et al., U.S. Appl. No. 13/439,728, filed Apr. 4, 2012.
Non-Final Office Action from U.S. Appl. No. 13/439,728, dated Jul. 18, 2012.
Final Office Action from U.S. Appl. No. 13/439,728, dated Nov. 6, 2012.
Advisory Action from U.S. Appl. No. 13/439,728, dated Jan. 11, 2013.
Notice of Allowance from U.S. Appl. No. 13/439,728, dated Feb. 5, 2013.
Bierner et al., U.S. Appl. No. 13/464,167, filed May 4, 2012.
Non-Final Office Action from U.S. Appl. No. 13/464,167, dated Aug. 28, 2012.
Notice of Allowance from U.S. Appl. No. 13/464,167, dated Apr. 18, 2013.
Bierner et al., U.S. Appl. No. 13/464,196, filed May 4, 2012.
Notice of Allowance from U.S. Appl. No. 13/464,196, dated Aug. 13, 2012.
Bierner et al., U.S. Appl. No. 13/598,450, filed Aug. 29, 2012.
Notice of Allowance from U.S. Appl. No. 13/598,450, dated Feb. 26, 2013.
Bierner et al., U.S. Appl. No. 13/464,230, filed May 4, 2012.
Non-Final Office Action from U.S. Appl. No. 13/464,230, dated Oct. 16, 2013.
Final Office Action from U.S. Appl. No. 13/464,230, dated Apr. 23, 2014.
Advisory Action from U.S. Appl. No. 13/464,230, dated Jul. 30, 2014.
Bierner, G., U.S. Appl. No. 13/464,252, filed May 4, 2012.
Non-Final Office Action from U.S. Appl. No. 13/464,252, dated Jun. 11, 2014.
Bierner et al., U.S. Appl. No. 13/464,269, filed May 4, 2012.

(56) References Cited

OTHER PUBLICATIONS

Non-Final Office Action from U.S. Appl. No. 13/464,269, dated Apr. 25, 2014.
Bierner et al., U.S. Appl. No. 13/464,287, filed May 4, 2012.
Non-Final Office Action from U.S. Appl. No. 13/464,287, dated Jul. 10, 2014.
Palombo, G., U.S. Appl. No. 13/741,287, filed Jan. 14, 2013.
Non-Final Office Action from U.S. Appl. No. 13/741,287, dated Dec. 29, 2014.
Bierner, G., U.S. Appl. No. 13/946,986, filed Jul. 19, 2013.
Cooper, E., U.S. Appl. No. 13/946,989, filed Jul. 19, 2013.
Porter et al., U.S. Appl. No. 14/176,007, filed Feb. 7, 2014.
Just Answer, Terms of Service, 2004-2005 JustAnswer! pp. 1-12 http://web.archive.org/web/20080509130156/http://www.justanswer.com/tos.aspx.
Just Answer, Expert FAQ'S, 2004-2005 JustAnswer! pp. 1 http://web.archive.org/web/20070208193005/http://www.justanswer.com/help_expert.aspx.
Just Answer, Ask a Question, 2004-2005 Just Answer! pp. 1-2 http://web.archive.org/web/20080720171326/http://justanswer.com.
Just Answer, Expert Agreement, 2004-2005 JustAnswer! pp. 1-3 http://web.archive.org/web/20051127005457/http://www.justanswer.com/sa.asp.
International Preliminary Examination Report from International Application No. PCT/US2010/045232, dated Oct. 21, 2011.
International Search Report and Written Opinion from International Application No. PCT/US2010/045232, dated Oct. 1, 2010.
Supplementary European Search Report from EP Application No. 10808717.2, dated Jan. 21, 2014.
Coutu, A., "Consultation Fee Rates—Consultant Fees," Consultant Journal, May 26, 2006, pp. 1-5.
Notice of Acceptance from Australian Application No. 2010282516 dated Jan. 31, 2014.
Non-Final Office Action from U.S. Appl. No. 12/854,846 dated Feb. 13, 2014.
"Just Answer: Help," 2004-2005, Just Answer!, htlp://web.archive.org/web/20050828022539/http://www.justanwer.com/help.asp#FAQ54, pp. 1-9.
Phillips, M., "Get Expert Answers with JustAnswer," WebsiteMagazine.com, Aug. 29, 2008, pp. 1-2.
Huntington, D.; "Expert Systems for Online Advice: Knowledge at Your Fingertips," PCAI Jul./Aug. 2000, pp. 26-27 and 49-50.
Muller et al., "Electronic Marketplaces of Knowledge: Characteristics and Sharing of Knowledge Assets," Proceedings of the International Conference on Advances in Infrastructure for e-Business, e-Education, e-Science, and e-Medicine on the Internet, Jan. 2002, pp. 1-12.
Non-Final Office Action from U.S. Appl. No. 13/464,252, dated Jan. 14, 2015.
Non-Final Office Action from U.S. Appl. No. 13/464,269, dated Jan. 26, 2015.
Non-Final Office Action from U.S. Appl. No. 13/464,287, dated Jan. 29, 2015.
Non-Final Office Action from U.S. Appl. No. 13/946,986, dated Apr. 3, 2015.
Non-Final Office Action from U.S. Appl. No. 14/176,007, dated Apr. 7, 2015.
Kurtzig et al., U.S. Appl. No. 12/854,836, filed Aug. 11, 2010.
Non-Final Office Action from U.S. Appl. No. 12/854,836, dated Jul. 18, 2012.
Kurtzig et al., U.S. Appl. No. 12/854,849, filed Aug. 11, 2010.
Non-Final Office Action from U.S. Appl. No. 12/854,849, dated Jun. 26, 2012.
Kurtzig et al., U.S. Appl. No. 13/439,743, filed Apr. 4, 2012.
Non-Final Office Action from U.S. Appl. No. 13/439,743, dated Jun. 28, 2012.
Final Office Action from U.S. Appl. No. 13/439,743, dated Mar. 27, 2013.
Non-Final Office Action from U.S. Appl. No. 13/439,743, dated Dec. 5, 2012.

\* cited by examiner

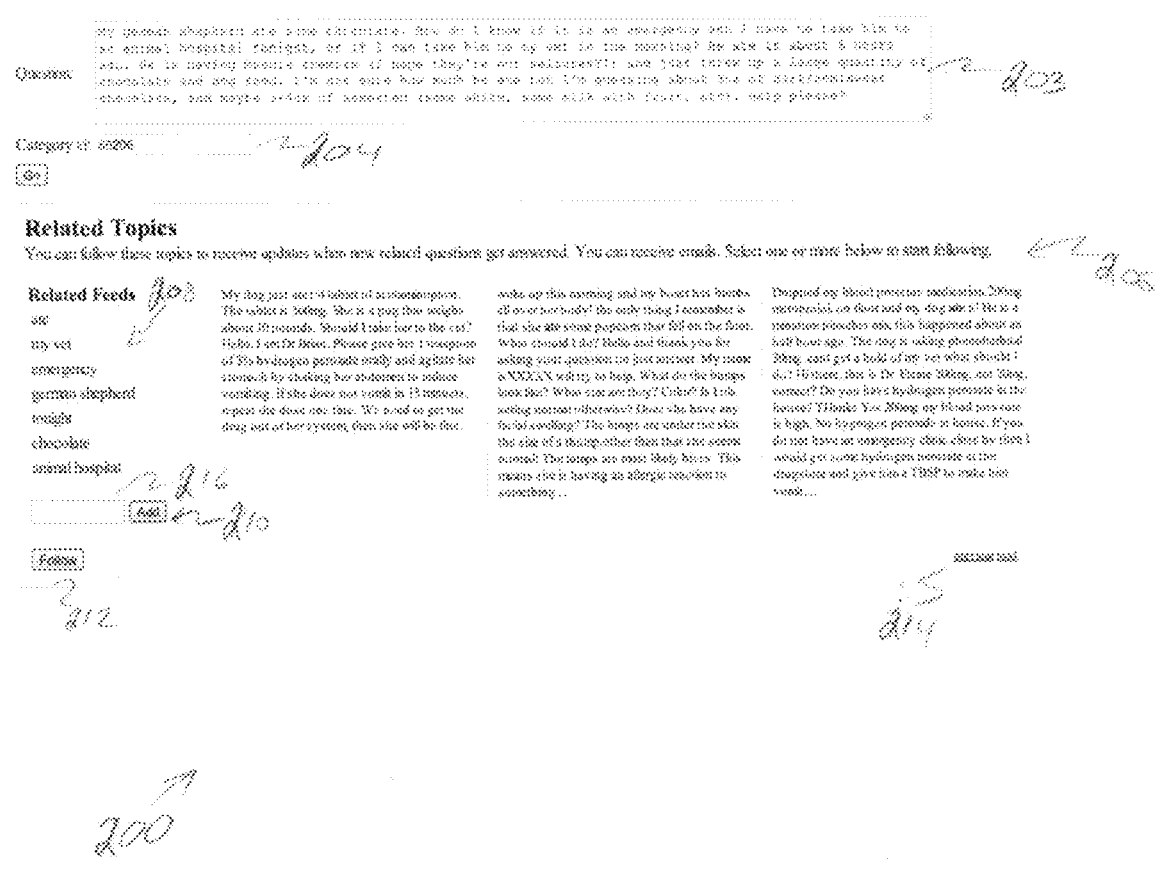

Related Topics

You can follow these topics to receive updates when new related questions get answered. You can receive emails. Select one or more below to start following.

Related Feeds
- cat
- my vet
- emergency
- german shepherd
- weight
- chocolate
- animal hospital

Fig. 2A

Related Topics

You can follow these topics to receive updates when new related questions get answered. You can receive emails. Select one or more below to start following.

- ~~build a fence~~
- as
- german shepherd
- chocolate
- ~~yes~~
- yorkie
- yorkerpoo
- yorkie mix
- yorkie poo
- yorkeities
- yorkie pin
- yorkie russell
- yorkie-apso
- yorkie-ton
- yorkillon
- yorkinese I just discovered now that my male beagle dog (20 pounds) ate my one whole box of 18 ounces (1 pound) box of See's dark chocolate candies. What emergency home treatment should I do? I read also just move that at a mild toxic for every pound of dog if they eat .7 ounces. He is probably about 20 pounds. Please help. I don't want to lose my baby. Thanks a lot! Elna(NNN) NNN-NNNHelene Elna, That is a lot of chocolate for a dog this size. It really should be treated as an emergency. Hospitals by making him vomit, giving activated charcoal, and then putting him on IV fluids for 12-24 hours.

My two dogs got loose during the day today, and besides wreaking havoc with trash (old papers, no food) they have consumed between them about a pound of granola (french vanilla almond crunch). There is no chocolate as the ingredient list. Sort is a pug/shepard mix and weighs about 10 pounds, Stella is a pug/chihuahua mix and weighs about 14 pounds. In other words, a whole lot of granola for 2 small dogs. They are behaving completely normally. I don't know how long ago they ate it, but there is no loose stool or vomit anywhere...

My dog's poos are swollen and bleeding. His belly and ears are really red also...I saw his paws were bleeding so I thought it was nothing serious, but now I am thinking it may be serious, when I get home two afternoon he had a bowel movement and it was like liquid chocolate pudding. Any ideas what is wrong?

previous next

METHOD AND APPARATUS FOR CREATING A PERSONALIZED QUESTION FEED PLATFORM

RELATED APPLICATIONS

The present application is a Continuation-in-Part of U.S. patent application Ser. No. 12/854,846 filed on Aug. 11, 2010; U.S. patent application Ser. No. 12/854,838 filed on Aug. 11, 2010; U.S. patent application Ser. No. 13/439,743 filed on Apr. 4, 2012, which in turn is a Continuation of U.S. patent application Ser. No. 12/854,849 filed on Aug. 11, 2010, all of which claim priority to U.S. Provisional Application No. 61/233,046 filed on Aug. 11, 2009, all of which are incorporated herein by reference.

The present application is also a Continuation-In-Part of U.S. patent application Ser. No. 13/464,230 filed on May 4, 2012, and is incorporated herein by reference.

FIELD

The present application relates generally to the field of computer technology and, in specific exemplary embodiments, to methods and systems for allowing users of a consultation system to create, edit and follow information feeds related to a subject matter category, topic, person or a combination thereof allowing increased user engagement with the consultation system.

BACKGROUND

Online consultation systems are gaining popularity because they allow Internet users to easily gain access to accurate information provided from a reliable source. In the exemplary online consultation system described in the U.S. patent application Ser. No. 12/854,846 filed on Aug. 11, 2010 and entitled "Method and Apparatus for Creation of New Channels in a Consultation System," and U.S. patent application Ser. No. 13/464,230 filed on May 4, 2012, entitled "Method and Apparatus for Identifying Similar Questions in a Consultation System" both by inventors Gann Bierner and Edwin Cooper, visitors to an online consultation system 100 post questions in hundreds of subject matter categories on a variety of topics and verified subject matter experts answer the visitors' questions.

Information and content posted on any website is one of the primary attractions for visitors to the website. The content found on the website is also helpful to engage visitors and entice them to come back and revisit the website. As new questions are posted to an online consultation system 100 and new answers are provided to the questions, valuable content is created that could be relevant, interesting and useful to visitors of the online website. Allowing visitors to create and customize information feeds related to topics that may be of interest to them and are based on the content generated in the online consultation system would therefore be highly desirable, and can promote increased engagement and encourage revisits by users and visitors to the online consultation system.

BRIEF DESCRIPTION OF DRAWINGS

The appended drawings are merely used to illustrate exemplary embodiments of the present invention and cannot be considered as limiting its scope.

FIGS. 2A-D show an exemplary feed creation user interface for non-registered visitors.

DETAILED DESCRIPTION

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

As used herein, the term "or" may be construed in either an inclusive or exclusive sense. Similarly, the term "exemplary" is construed merely to mean an example of something or an exemplar and not necessarily a preferred or ideal means of accomplishing a goal. Similarly, the embodiments are given merely for clarity and disclosure. Alternative embodiments may employ other systems and methods and are considered as being within the scope of the present invention.

Exemplary embodiments of the present invention provide systems and methods for users and visitors of a website to create and follow information feed based on the content of the visited website. In exemplary embodiments, feeds may be created based on one or more categories, topics, experts, users, questions, or any combination of the aforementioned.

Alternative embodiments of the present invention further provide systems and methods for providing a user interface for visitors and users to engage with a website such as an exemplary online consultation system by allowing users to seamlessly submit their own content or question.

Figure 1:
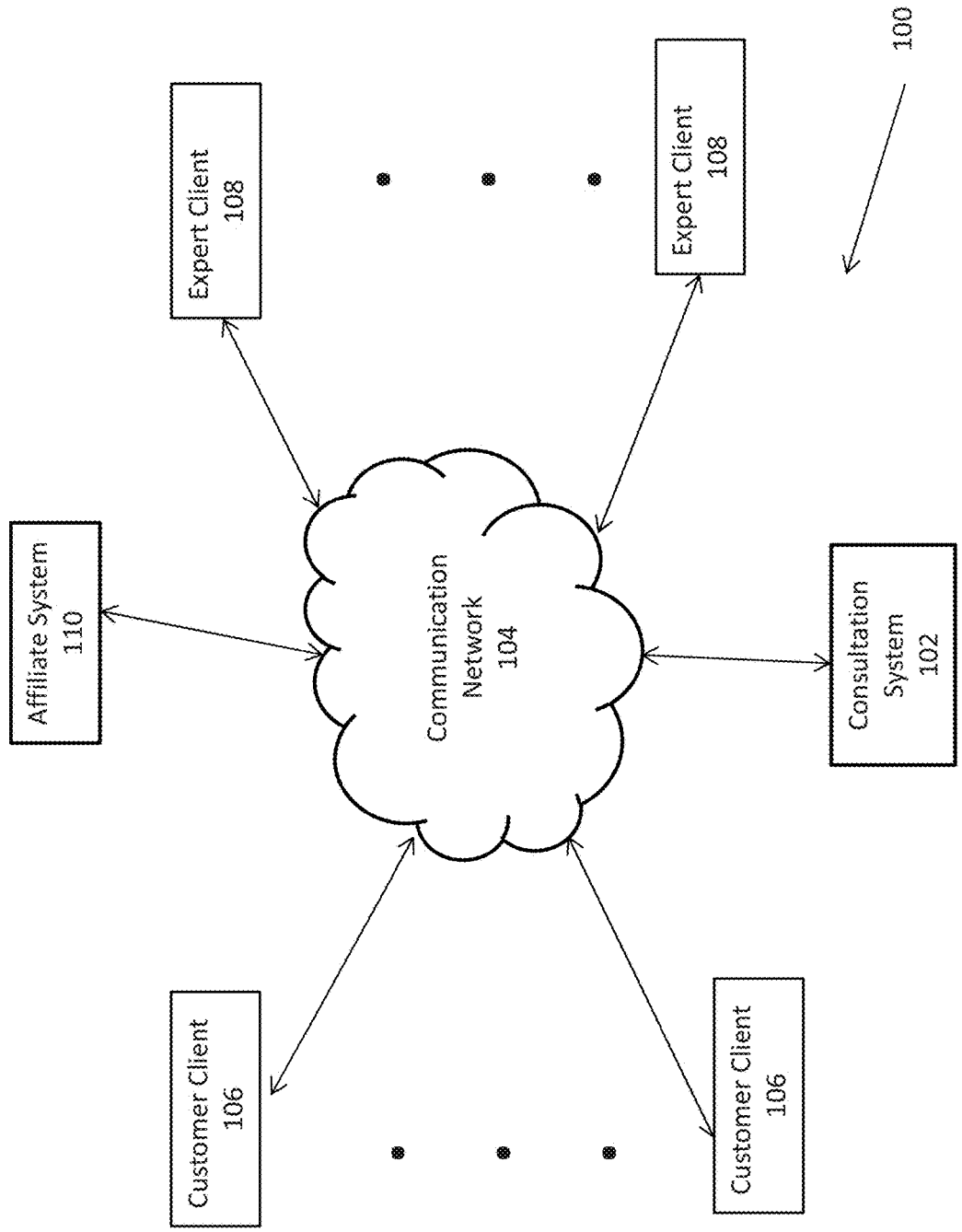
FIG. 1 shows an exemplary environment in which embodiments of the present invention may be practiced.

FIG. 1 shows an exemplary environment 100 in which embodiments of the present invention may be practiced. The exemplary environment 100 comprises a online consultation system 102 coupled via a communications network 104 to one or more user clients 106 and expert clients 108. The communication network 104 may comprise one or more local area networks or wide area networks such as, for example, the Internet and telephone systems.

In exemplary embodiments, the online consultation system 102 provides a forum where users may post or pose questions for which experts may provide answers. The online consultation system 102 may provide the forum via a website. In some embodiments, at least portions of the forum (e.g., asking of questions or receiving of responses) may occur via the website, mobile phone, other websites, text messaging, telephone, video, VoIP, or other computer software applications. Because the online consultation system 102 is network based e.g., Internet, public switched telephone network (PSTN), cellular network), the users using the online consultation system 102 and experts providing answers may be geographically dispersed (e.g., may be located anywhere in the world). As a result an expert may provide answers to a user thousands of miles away. Additionally, the online consultation system 102 allows a large number of users and experts to exchange information at the same time and at any time.

By using embodiments of the present invention, a user posting a question may easily obtain a tailored answer. Accordingly, the use of the online consultation system 102 discussed herein may obviate a need for additional searching for answers, which may have the technical effect of reducing computing resources used by one or more devices within the system. Examples of such computing resources include, without limitation, processor cycles, network traffic, memory usage, storage space, and power consumption.

In various embodiments, a user may pose a question and one or more experts may provide answers. In various embodiments, the question may be matched with a category of experts, more specific set of experts, or even individual experts, sometimes on a rotating basis by user selection, a keyword based algorithm, a quality based algorithm (or score or rating), or other sorting mechanism that may include considerations such as, for example, likely location or time zone. A back-and-forth communication can occur. The user may accept an answer provided by one or more of the experts. In an alternative embodiment, the user may be deemed to have accepted the answer if the user does not reject it. By accepting the answer, the user validates the expert's answer which, in turn, may boost a score or rating associated with the expert. The user may also pay the expert for any accepted answers and may add a bonus. The user may also leave positive, neutral or negative feedback regarding the expert.

The exemplary user client 106 is a device associated with a user accessing the consultation system 102 (e.g., via a website, telephone number, text message identifier, or other contact means associated with the online consultation system 102). The user may comprise any individual who has a question or is interested in finding answers to previously asked questions. The user client 106 comprises a computing device (e.g., laptop, PDA, cellular phone) which has communication network access ability. For example, the user client 106 may be a desktop computer initiating a browser for access to information on the communication network 104. The user client 106 may also be associated with other devices for communication such as a telephone.

In exemplary embodiments, the expert client 108 is a device associated with an expert. The expert, by definition, may be any person that has, or entity whose members have, knowledge and appropriate qualifications relating to a particular subject matter. Some examples of expert subject matters include health (e.g., dental), medical (e.g., eye or pediatrics), legal (e.g., employment, intellectual property, or personal injury law), car, tax, computer, electronics, parenting, relationships, and so forth. Almost any subject matter that may be of interest to a user for which an expert has knowledge and appropriate qualifications may be contemplated. The expert may, but does not necessarily need to, have a license, certification or degree in a particular subject matter. For example, a car expert may have practical experience working the past 20 years at a car repair shop. In some embodiments, the expert may be a user (e.g., the expert posts a question).

The expert client 108 may comprise a computing device (e.g., laptop, PDA, cellular phone) which has communication network access ability. For example, the expert client 108 may be a desktop computer initiating a browser to exchange information via the communication network 104 with the online consultation system 102. The expert client 108 may also be associated with other devices for communication such as a telephone.

In accordance with one embodiment, an affiliate system 110 may be provided in the exemplary environment 100. The affiliate system 110 may comprise an affiliate website or other portal which may include some of the components of the online consultation system 102 or direct their users to the online consultation system 102. The affiliate system 110 may also be associated with other devices for communication such as a telephone. For example, the affiliate system 110 may provide a website for a car group. A link or question box may be provided on the affiliate website to allow members of the car group to ask questions. Answers in response to the questions may be provided, in part, from the online consultation system 102, or the member asking the question may be directed to the online consultation system 102 for the answer. The members may, in some cases, only have access to certain categories or experts. In one embodiment, a RSS feed may be used to feed data from the consultation system 102 to the affiliate system 110. The users of the affiliate system 110 may be tagged with the affiliate depending on if and how the users are registered with the online consultation system 102. It should be noted that the affiliate system 110 may comprise any type or category of affiliate sites. In some cases, the affiliate system 110 may involve questions being answered by the affiliate or persons involved with the affiliate.

The environment 100 of FIG. 1 is exemplary. Alternative embodiments may comprise any number of online consultation systems 102, user clients 106, expert clients 108, and affiliate systems 110 coupled together via any type of one or more communication networks 104, and still be within the scope of exemplary embodiments of the present invention. For example, while only one online consultation system 102 is shown in the environment 100, alternative embodiments may comprise more than one online consultation system 102. For instance, the online consultation systems 102 may be regionally established.

Referring now to FIG. 2A, an exemplary feed creation user interface (UI) for first time visitors to the online consultation system 102 is shown. For the purposes of illustration and describing the various features of exemplary embodiments of the present invention, an online consultation system 102 shall be used as an exemplary website visited by visitors or existing users. In exemplary embodiments, the consultation system 102 provides a forum where users may post questions on hundreds of subjects and where subject matter experts provide answers to the posted questions. In exemplary embodiments of the present invention, at least portions of the online consultation forum 102 (e.g., asking of questions or receiving of responses) may occur via the website, mobile phone, other websites, text messaging, telephone, video, VoIP, or other computer software applications. Because the consultation system 102 is network based e.g., Internet, the users using the consultation system 102 and experts providing answers may be geographically or temporally dispersed (e.g., may be located anywhere in the world in different time zones). As a result an expert may provide answers to a user thousands of miles away. Additionally, the consultation system 102 allows a large number of users and experts to exchange information at the same time and at any time.

In various embodiments of the online consultation system 102, a user may pose a question related to a particular category and/or topic, and one or more subject matter experts may provide answers. A back-and-forth communication can occur at the end of which the subject matter expert provides a final answer to the user posted question. The user may accept or reject the answer. In exemplary embodiments other experts may provide new answers or comment on the first expert's answer. Once the question and answer thread is completed, it is stored in the online consultation system 102's database of previously submitted question and answer threads. The consultation system 102 is described in more detail in previously filed U.S. patent application Ser. No. 12/854,846 filed on Aug. 11, 2010 and entitled "Method and Apparatus for Creation of New Channels in a Consultation System," U.S. patent application Ser. No. 12/854,838 filed on Aug. 11, 2010 and entitled "Method and Apparatus for Expert Quality Control," U.S. patent application Ser. No. 12/854,849 filed on Aug. 11, 2010 and entitled "Method and Apparatus for Determining Pricing Options in a Consultation System," and U.S. patent application Ser. No. 13/464,230 filed on May 4, 2012, entitled "Method and Apparatus for Identifying Similar Questions in a Consultation System," all having Gann Bierner as a common inventor, and all herein incorporated by reference.

In exemplary embodiment of the present invention, in order to enhance the user experience and increase their engagement with the online consultation system 102, the users may be allowed to view some or all the previously submitted questions and answer threads stored in online consultation system 102's database. The online consultation system 102's question and answer database comprises valuable content that in most cases may be accessed by visitors and users by various means including clicking on links provided through search engines, visitors clicking on a pay per click advertising, or users who have a subscription to the online consultation system 102 and are interested in questions posted by others on various subjects.

One of the primary opportunities to engage new visitors and existing customers with the online consultation system 102 is to allow them to create, customize and follow content feeds related to subjects of interest to and based on the posted questions and answers. A first time visitor may be directed to the online consultation website 102's landing page after having submitted a query using a commercial search tool such as Google™ or Bing™. Alternatively, visitors may find their way to the online consultation website 102 by clicking on a pay per click (PPC) advertising or search engine optimized SEO link selection. In exemplary embodiments of the present invention, the landing page of the online consultation system 102 may be customized based on the visitor's search query, PPC advertising or SEO content. Alternatively, a user may get to the online consultation system 102 by directly typing the URL for the website in the address field. However when a visitor lands at the online consultation system 102, he or she may be induced to engage with the online consultation system 102 by allowing the visitor to search through the question and answer database for interesting question and answer threads. Visitors' engagement with the online consultation system 102 may be further enhanced by allowing the visitor to create one or more content feed on subjects of interest. Exemplary system and methods of the present invention enable the creation of content feeds based on selected topics, selected categories, selected experts or users, or based on similar questions, or a combination thereof.

Referring now to FIG. 2A, an exemplary feed creation user interface (UI) for first time visitors 100 is shown. The feed creation UI 200 comprises of a display window 203 used to display an "original question", a "category Id" field 204, a related topic display window 206, a related feeds window 208, an add button 210, a follow button 212 and a navigation link 214. The display window 203 displays an "original question," whose content is identified by a commercial search engine query such as Google or Bing as being relevant to a query posted by a visitor of the online consultation system 102. The search engine query would display a series of possible matches with at least one link to the "original question." In exemplary embodiments of the present invention, once the visitor clicks on the link corresponding to the "original question" posted to the online consultation system 102, the visitor lands on webpage displaying the feed creation UI 200 of the online consultation system 102, where the "original question" may be displayed in full or partially in the display window 203. The "category Id" or description field 204 displays the description or identification information of the subject category corresponding to the original question displayed in the question display window 203. The exemplary online consultation system 102 may have hundreds of categories and subcategories, each related to different subject matters, each including tens to hundreds of subject matter experts, ready to answer user posted questions. The "related topic" display window 206 is used to display questions that include topic or topics found in the "original question." The related topics may be identified implicitly or explicitly. The implicitly identified topics are topics that are automatically identified by the online consultation system 102 as being present in the "original question" and displayed in the related topic feeds window 208. In exemplary embodiments, the visitor/user selects one or more of the topics implicit in the content of the "original question," automatically identified by the online consultation system 102, and displayed in the "related topic feeds" window 208, by clicking or highlighting the desired topic. The online consultation system 102 automatically searches its database of submitted question and answer threads identifying related questions that include one or more selected implicit topics. The related questions are displayed in the related question window 206. The identification of related content based on implicit topics present in the "original question" is described in further detail and the subject of the U.S. patent application entitled "Method And Apparatus For Implicit Topic Extraction From The Content of An Online Consultation System," by the same inventors as the present application, Gann Bierner and Ashkan Gholam Zadeh, filed on the same day as the present application and herein incorporated by reference.

The explicitly identified topics are topics that are entered by the visitor in the explicit topic field 216 and submitted by clicking the add button 210. In exemplary embodiments, once the unregistered visitor starts typing an explicit topic in the explicit topic field 216, the online consultation system 102 may dynamically, in real-time be suggesting potential topics. So, for example, as the visitor is typing the characters "vom," the system may be displaying "vomiting" as a potential explicit topic. Topics are suggested based their relatedness to the original question. In exemplary embodiments, once the visitor adds an explicit topic to the list of topics of interest, the explicit topic is added to the list of topics displayed in the related topic feed window 208. In exemplary embodiment of the present invention, each of the related questions that are displayed in the related question window 206 would include at least one of the selected explicit topics or implicit topics. In alternative embodiments, each question populating the related question window 206 would include all explicitly and implicitly selected topics. The identification of the related questions based on explicit topics is the subject of the U.S. patent application Ser. No. 13/464,230 filed on May 4, 2012, entitled "Method and Apparatus for Identifying Similar Questions in a Consultation System," from the which the present invention is a continuation-in-part, having Gann Bierner as a common inventor, and herein incorporated by reference.

In exemplary embodiments of the present invention, once the visitor has selected some implicit topics of interest from the list of implicit topics displayed in the related topic feeds window 208, and added additional explicit topics of interest, clicking the "follow" button 212, the online consultation system 102 automatically searches its database of question and answer threads, identifying questions related to the selected topics, and displaying them in the related question display window 206. The questions used to populate the related question window 206 are questions previously submitted by users of the online consultation system 102, seeking answers from subject matter experts on a variety of topics in tens or hundreds of categories and subcategories. The displayed questions include one or more of the implicit topics present in the "original question" and/or explicit topics of interest identified by the user. In one example, an Internet user referred to herein as a visitor submits a query to an Internet search engine such as Google® or Bing®. The search engine returns a link to the "original question" identifying the "original question" as a content that is relevant to the unregistered visitor query. Once the unregistered visitor clicks the "original question" link, the visitor lands on an exemplary unregistered visitor webpage 100. The "original question" is displayed in the "original question" display window 202, while the related feeds window 208 is automatically populated with the implicit topics found in the "original question." The unregistered visitor may select one of more of the implicit topics identified and may add one or more explicit topics of interest that are not contained in the original question. After the user clicks the follow button 212, the online consultation system 102 automatically searches its database of archived question and answer threads, and identifies the questions or threads containing the implicit and/or explicit topics selected by the visitor, displaying them in the related question window 206. The previous/next button 214 allows the user to navigate through and display more questions displayed in the related question display window 206.

Figure 2B:

As can be seen in FIG. 2B, the related topic question feed displayed in the related topic question window 206, displays topic feeds that are based on the selected implicit related topic "German Shepard" 205. In the exemplary embodiment of FIG. 2B, the keyword "German Shepard" may be shown in bolded characters wherever the topic appears in a related question.

As shown in FIG. 2B, question and answer threads including personally identifiable information (PII) such as last names, telephone numbers or address are filtered to delete or mask the PII information and protect the privacy of the users who posted the questions.

Figure 2D:
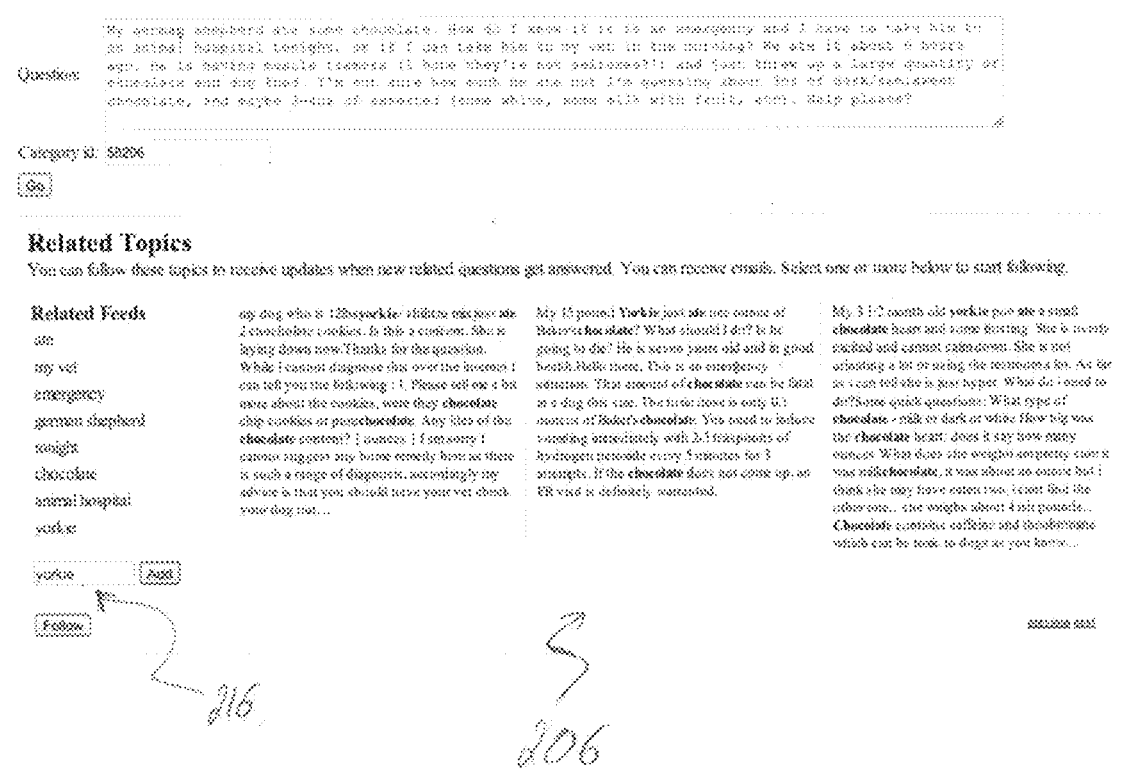

In the example shown in FIG. 2C, the visitor may be interested in the finding the effects of her "Yorkie" having eaten some chocolate. As a result, the visitor may submit the query "dog eat chocolate" to an Internet search engine. The search engine will display a link to an "original question," saved on the online consultation system 102's database that contains topics relevant to the user submitted query. Once the visitor selects the link corresponding to the "original question", she is directed to the visitor landing page 200, displaying the exemplary UI of FIG. 2A, where a question relevant to the query "dog eat chocolate" also referred to as the "original question" is displayed in the display window 203. The online consultation system 102 automatically identifies and extracts implicit topics present in the "original question," and displays the extracted topics in the related feeds window 208. As seen in FIG. 2C, the related feeds window 208 displays "ate", "my vet", "emergency", "German shepherd", "tonight", "chocolate" and "animal hospital" as the first few topics identified as being present in the "original question." In exemplary embodiments of the present invention, the related feeds topics may be displayed alphabetically, in the order they appear in the original question, or any other desired order. In alternative embodiments, if there are additional implicit topics that are present in the original question, the topics may be displayed through a drop down list 217 that may become visible when the visitor moves her mouse over the related topic feeds window 208, similar to the drop down list shown in FIG. 2D. Furthermore, the unregistered visitor of the online consultation system 102 may add related topics explicitly using the "related feed topic" field 216. For example, as shown in FIG. 2D, the unregistered user may input "Yorkie" as the explicit topic he or she may be interested in. As a result, the related topic window 206 will display questions previously submitted the online consultation system 102 that include the explicit topic "Yorkie", as well as any selected implicit topics, including the topics: "ate," "chocolate," "emergency," etc.

In exemplary embodiments of the present invention, the contents of the questions in the related topic display window 206 may be adjusted by the system or based on the user's preferences. For example the font size of the displayed text may be adjusted to display more or less content, fewer or more questions, and more or less of a question at a given related topics window 206. The details of the systems and methods used to vary the displaying related topic questions in the related topic question window 206 will be discussed in further detail herein below, in FIG. 4.

FIG. 2C further shows questions displayed in the related question window 206 that are based on the implicit topics "ate" and "chocolate," and the related explicit topic "Yorkie." In exemplary embodiments of the present invention, every occurrence of a related keyword within a related question is shown in bolded, italic, or different color or size font.

FIG. 2D illustrates an example of a drop down list 217 of candidate explicit topics matching the visitor's input, as the visitor is typing his or her explicit topics of interest in the explicit topic field 216. In exemplary embodiments of the present invention, the drop down list of topics corresponds to all topics previously identified as relevant topics contained in all the questions stored in the online consultation system 102's database. Every time a visitor inputs a new character of explicit topic of interest in the explicit topic field 216, the online consultation system 102 regenerates a new list of possible explicit topics 217 based on the new character typed.

Figure 3:
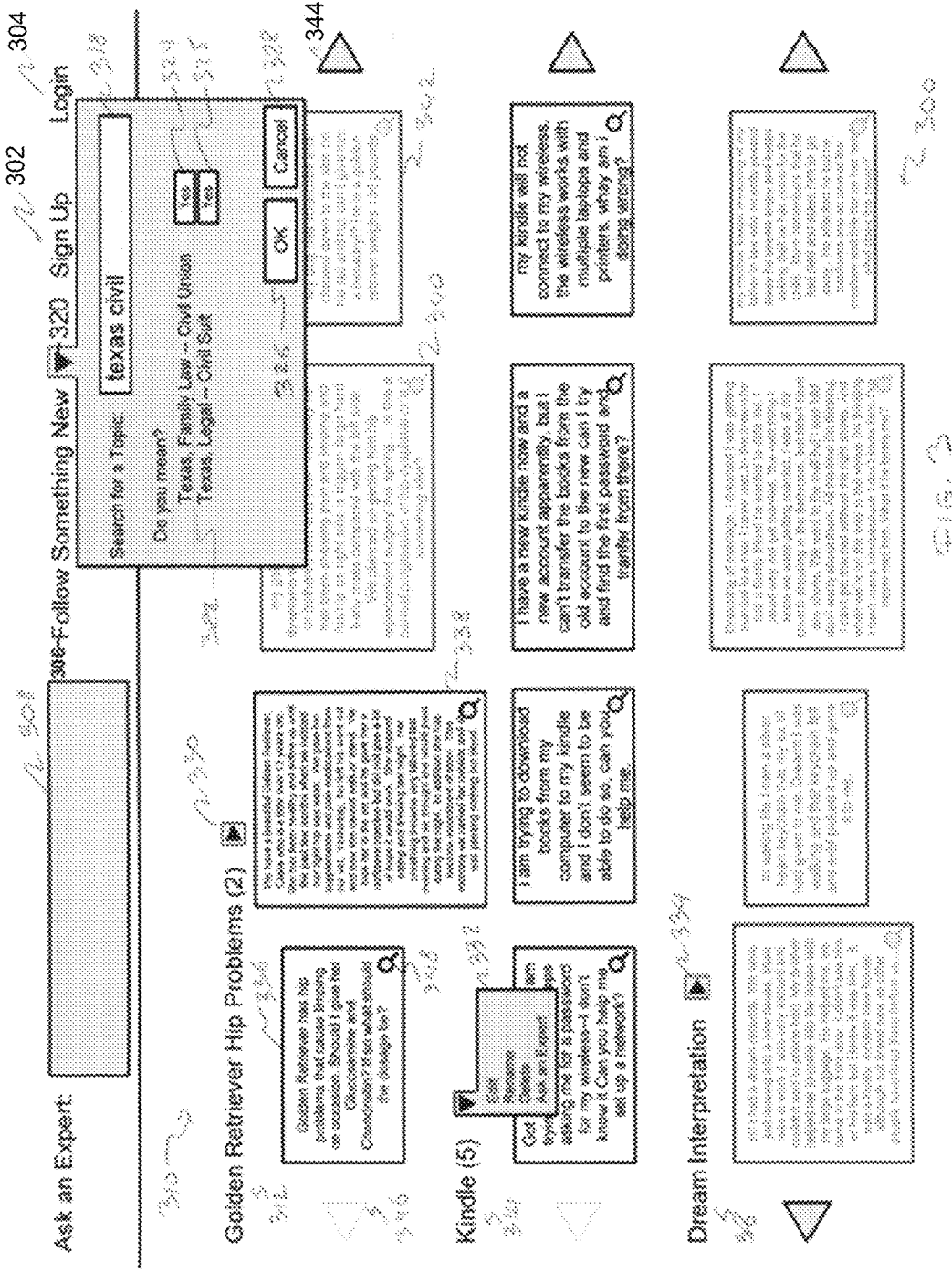
FIG. 3 an exemplary UI for registered users to create, edit and follow information feeds.

FIG. 3 shows an exemplary user interface (UI) and topic feed page for registered visitors to create, edit and follow information feeds. In exemplary embodiments of the present invention, a visitor may register with the online consultation system 102 to create and receive information feed based related to his topics of interest. Once the registration to the online consultation system 102 is completed, the registered visitor may use a UI and topic feed display page 300 such as the one shown in FIG. 3 to create, edit, delete and generally customize his topic feeds. In exemplary embodiments of the present invention, the user interface 300 may include a "sign up" button 302, a login button 304, a "follow something new" button 306, "Ask an expert" field 308 and a feed display window 310 for displaying feeds selected by the registered visitors. Additionally, each topic feed may include a title display window 312, 314 & 316, used to display the title corresponding to the topic feed displayed below. In exemplary embodiment shown in FIG. 3, three distinct topic feed are displayed in the topic feed page 300, where each topic feed can be independently created and edited.

As shown in FIG. 3, the registered visitor may use the login button 304 to log into his or her account and access his UI and topic feed page 300. Unregistered visitors may use the sign up button 302 to register to the online consultation system 102 and create their customized topic feeds.

Once logged into the system, the users may search for new topics by entering "explicit" search keywords by clicking the "follow something new" button 306 to open a pull-down menu 320, including the "search for a topic field" 318. In exemplary embodiments of the present invention, as the registered visitor enters 'explicit' search keywords in the topic field 318, the online consultation system 102 processes the input and may in real-time display or suggest feed topics relating to the explicit search keywords. As shown in FIG. 3, the "follow something new" field 306 expands into a pull-down window 320, displaying potential explicit topics 322, suggested in real-time by the online consultation system 102. In exemplary embodiments of the present invention, the online consultation system 102 may require the registered visitor to select one of the potential topics of interest 322 that correspond to the explicit keywords entered in the "search a topic" field 318. The user may select one or more of the alternative potential topics of interest by clicking the corresponding "yes" button 324 or 325. Once the registered visitor has entered the topic search keywords, he may initiate the search by clicking the "OK" button 326 or cancel the explicit topic selection by clicking the "cancel" button 328. The user inputted explicit topics entered by a registered visitor in the "search a topic" field 318 are processed by the online consultation system 102 in a similar manner as the explicit related topics added by the unregistered visitors in the "related feed field" 216 shown in FIG. 2A.

The "Ask an expert" field 308 may be used by visitors to submit questions in a variety of topic categories and subject matters. Alternatively, the visitor can post her question to the online consultation system 102 by clicking the feed edit button 330, and selecting the "Ask an Expert" option from the drop down menu similar to the one shown in 332. Once the "Ask an Expert" option is selected, a window such as the "Ask an Expert" field 308 opens up, where the registered visitor can post his or her question.

As seen from FIG. 3, in exemplary embodiments of the present invention, each topic feed, 312, 314 & 316 includes a title, a feed edit button 330, 332 and 334 which as previously described may expands into a drop down menu providing the options of editing, renaming, deleting the feed and submitting a question by using the "Ask an Expert" option. Additionally, each topic feed 312, 314 and 316 may include one or more panes 336, 338, 340 and 342 each used to display one question and answer thread, each question and answer thread related to the feed title 312, 314 and 316 respectively, each feed title 312, 314 and 316 based on one or more feed topics created by the registered visitor. Each topic feed 312, 314 and 316 may include navigation buttons 344 and 346 used to navigate back and forth between question and answer panes 336-342. Additionally, each question and answer pane 336-342 may include a pane expansion button 348 which upon selection would expand the size of the pane to the next larger size, allowing more of the question and answer thread to be read or allowing the font size to increase for easier readability. In alternative embodiments of the present invention, multiple clicks of the expansion button 348 would expand the corresponding question and answer pane to the next larger size multiple times. If the maximum expansion size is already reached, the next click of the expansion button 348 may reduce the size of the question and answer pane down to the next smaller size. In exemplary embodiment of the present invention, the active panes may be highlighted (see active pane 338) and inactive panes may be masked (see inactive pane 340).

Additionally, the original display size (width and height) of each question and answer pane 336-342, or the relative size of the font used to display each question and answer in each pane may be adjusted by the online consultation system 102, or based on the visitor's preferences. Furthermore, certain preferences or constraints may limit the acceptable or allowable range of values for the height, width or font size for each Q&A pane. For example, each question and answer thread may require a minimum amount of content to allow the visitor to have an overall comprehension of the topics present in each Q&A pane. The process of sizing of the Q&A pane is described in further detail, in FIG. 3 below.

As shown in FIG. 3, in alternative embodiments of the present invention, question feeds may be presented as a horizontally displayed array of boxes or panes containing the questions. It would be apparent to one of skill in the art that alternative presentation styles may be selected for presenting the question feeds. For example, question feed panes 336-342 may be displayed in a vertical fashion. Each question feed box or pane may vary in length, width and font size within certain required bounds. In exemplary embodiments of the present invention, these three parameters are modified to fit a required minimum number of characters of the question allowing each question to be as readable and understandable to the visitor as possible. If the question is too big to fit the display pane, it may be truncated. Depending on the visitor and or system preferences, the algorithm may be used to maximize vertical space, horizontal space, increase the number of question panes, or set the font size at a certain size.

Figure 4:
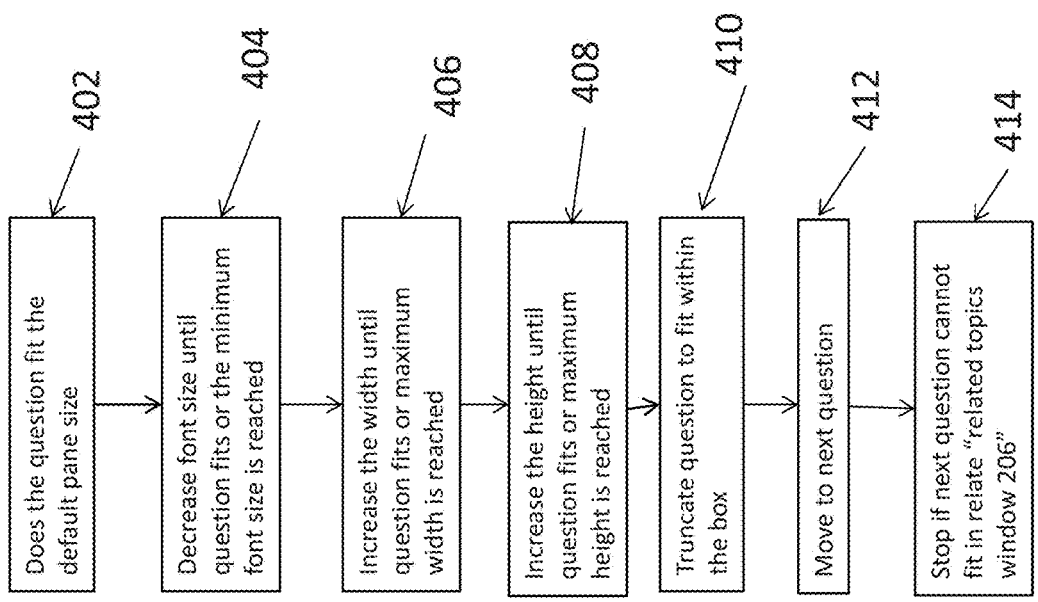
FIG. 4 shows an exemplary flowchart of a method of optimizing the displaying of information feeds.

FIG. 4 shows an exemplary flowchart of a method of optimizing the displaying of information feeds. In alternative embodiments of the present invention, a greedy algorithm may be applied to each question at a time to adjust various display factors in order to optimize the way question feeds are displayed within the related question display window 206 and/or within each feed panes (e.g. 336-342). Assuming a default or preset width, length and font size for the question feed pane and the display characters, the goal may be set for example, to minimize the vertical space. Referring now to FIG. 4, in operation 402, the question pane size with the preset width and length is compared to the question preset font size to see if the question fits the default pane. If the question thread with the preset font size does not fit the default pane size, in operation 404, the first parameter namely the font size is decreased until either the question fits in the display pane or the minimum size font is reached.

In operation 406, the second parameter, e.g. the width is increased until either the question fits the display pane, or the maximum pane width is reached for this window. In operation 408, the third parameter, namely the height is increased until the question fits the pane or the maximum height is reached.

After maximum width, height and font size for displaying the current question is reached but the question still does not fit the display pane, in operation 410, the question is truncated to fit the display pane and the process continues with the next question. In exemplary embodiment of the present invention, the question is simply truncated past the last character that fits in the display pane. In alternative embodiments of the present invention, the question is truncated in a more intelligent manner by deleting content that contributes the least to the readability of the question and the user comprehension.

In operation 412, if adjustments in the size of the next question pane would not allow the question pane to fit within the display window (e.g. question feed pane 336), the process ends. In operation 414, the process of fitting questions within the feed display window 310 ends if the next question cannot be adjusted to fit the feed display window 310 of FIG. 3.

Figure 5:
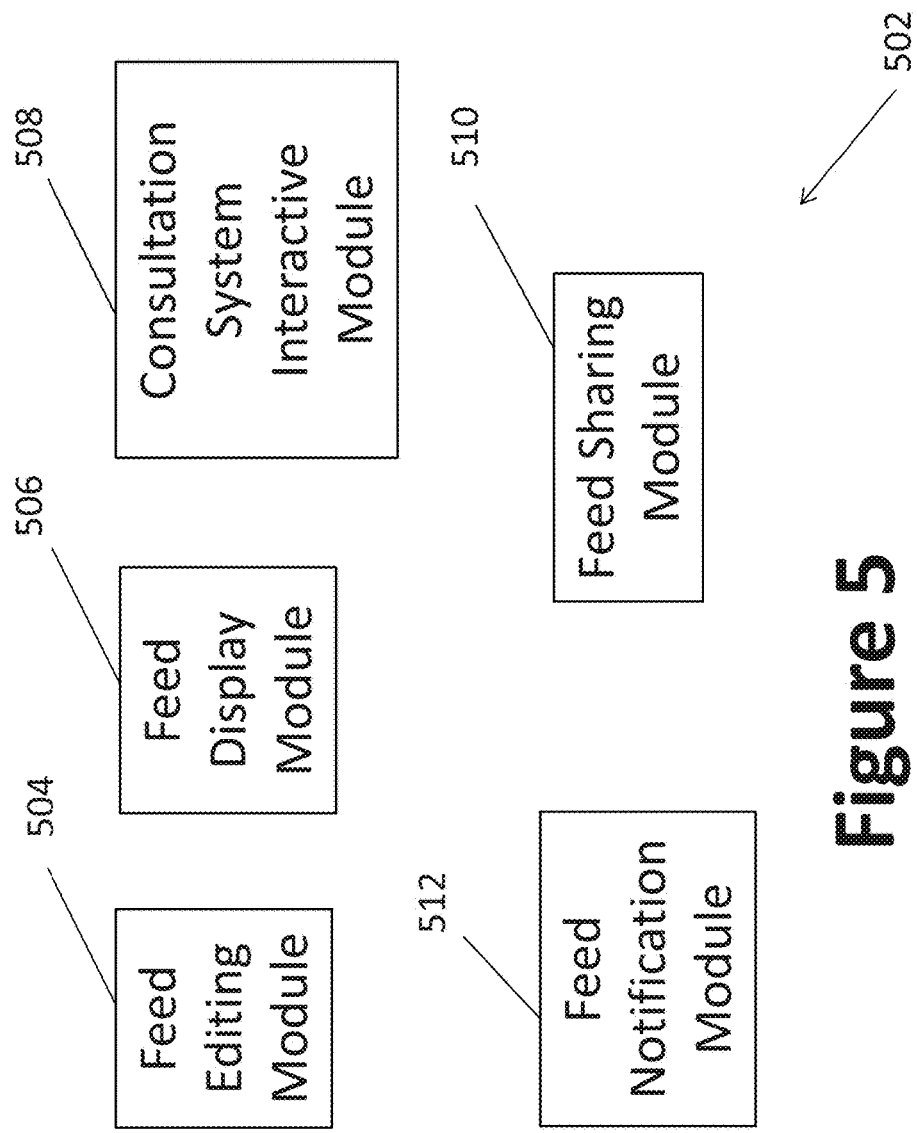
FIG. 5 shows block diagram of an exemplary platform for creating, editing and viewing question feeds.

FIG. 5 shows a block diagram of a system for creating, editing and following question feeds. The content viewing system 502 includes a feed creation and editing module 504, a feed viewing module 506, a consultation system interactive module 508, a feed sharing engine 510, and a feed notification engine 512.

The content feed creation editor 504 allows the user to create new feeds and add, edit or delete existing feeds. In the exemplary embodiment of the online consultation system 102, using the content feed editor 504, the user may create a new information feed that is based on one or more categories, topics, experts, questions, persons, or a combination of the above. The information feed that is based on a person may relate to either an expert or a particular user posting questions to the online consultation system 102. The visitors may access the feed page from a location off the site or many locations on the site via some sort of "follow" link or button. Feeds may be based on the category the question was asked in, the topic the question relates to, the expert that answered the question, the user that asked the question, or a combination of any of the above. For example, a question may be in the category of employment law, and the topic of "wrongful termination." The visitor may be allowed to enter an arbitrary string of characters as a topic, but the online consultation system 102 may also suggest topics from SEO keyword clusters, ontologies (e.g. animal breeds, car models, body parts), or automatically extracted topics.

Combination feeds allow the visitors to combine two or more topics of interest. For example, a feed may be based on the topic of "Doberman" and "hip problems." Based on this combination, only questions including both "Doberman" and "hip problems" are identified and presented as a feed. The combination feed may also be based on an expert or visitor and particular topics.

In alternative embodiments of the present invention, visitors may create a topic feed from a variety of locations within the online consultation website 102 funnel. For example, visitors or users of the online consultation system 102 may be allowed to create a feed after they have selected a category, or after having typed or submitted a question. They may also be allowed to create and edit new feeds using feed creation and editing module 504. The feed display module 506 allows visitors to view the related feeds. In various embodiments of the present invention, the feed display module 506 creates feed display windows 336 through 342. The consultation system interactive module 508 allows the visitor to interact with the online consultation system 102 by submitting questions to subject matter experts in a variety of categories. In exemplary embodiments of the present invention, if the visitor has not found an answer to his or her specific question in any question feed, he or she may choose to directly submit a question to the online consultation system 102 using a for example the "Ask an Expert" box 308 to submit his question.

The feed sharing module 510 allows visitors to share their feeds with others using for example an email from the other party. In exemplary embodiments, the content feed notification engine 512 notifies the visitor of any new questions received by the online consultation system 102 that relate to any of the visitor's topics of interest. The content feed notification engine 512 may also be used to notify third parties that a visitor would like to share all or parts of his or her questions feeds with the third party. The notification may be by email, message, SMS, mobile application push notification, social networking feeds like Facebook® or other means well known to one of skill in the art.

In exemplary embodiments of the present invention, topic feeds may be extracted automatically from the original question by the online consultation system 102, referred to herein as implicit topic extraction. Alternatively, topics may be manually added by the user by typing in the desired explicit topics in the explicit topic field 216 of FIG. 2A.

Explicit topic extraction is described in further detail in FIGS. 6 and 7, herein below.

Figure 6:
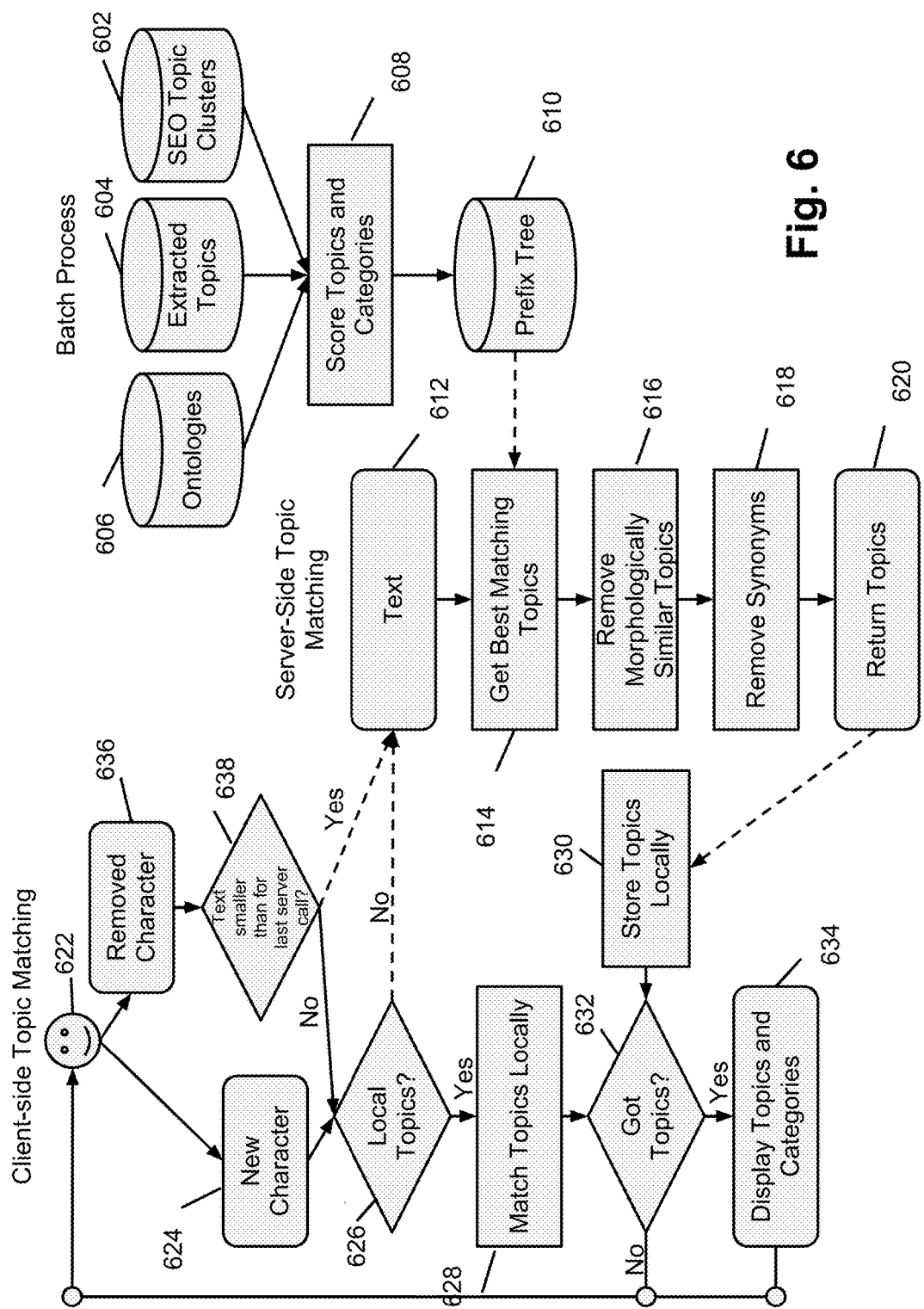
FIG. 6 describes an exemplary embodiment of a process of multi-subject explicit topic extraction.

With reference to FIG. 6, exemplary explicit topic extraction systems and methods start on the server side, with operation 606 with scoring all topics and categories from various sources. In operation 610, the scored topics and categories are used to form a prefix tree in operation. The topics and categories may be collected from different source. In the exemplary embodiment of FIG. 6, the topics and categories are collected from topics and categories clusters 602 identified for use with search engine optimization, implicitly extracted topics 604 from historic question data, and topics and categories in various ontologies related to various subject matters. It would be apparent to one of skill in the art that various ontologies may be compiled using publically available sources such as the Internet. As mentioned above, all the topics and categories found from various sources are scored and used to create a prefix tree 610. The prefix tree 610 is maintained on the server side of the online consultation system 102 and is accessible for topic matching as users begin to type their topics into the explicit topic field 216 of FIG. 2A.

Continuing the process on the server side, as the user 622 enters in the explicit topic field an explicit topic of interest, on the client-side, the system will try to match locally the typed characters to one more matching topics stored locally. If the system cannot find a locally stored topic that matches the string of typed characters, the system next sends a string of typed characters to the server for matching to a topic on the server side. So, in operation 612 on the server side, the character string received from the client machine is compared to the scored topics in the prefix tree 610. In operation 614, the topics that best match the transmitted text from the client are identified. In operation 616, morphologically similar topics are removed from the list of matching topics. In operation 618, synonyms are removed from the list of topics. And in operation 620, the remaining topics identified as a match are returned to the client as possible topic matches corresponding to the character string the user 622 has inputted thus far.

Continuing the process on the client side, as the user starts typing the topics of interest in the explicit topic field 216, the process begins in operation 612, where each new character typed triggers a comparison between the typed character string and the locally stored topics. It would be apparent that at the start of the process, the typing of the first character initiates the transmission of the typed character to topics on the server side database including the typed character. As previously discussed, the matching topics minus the morphologically similar topics and synonyms are transmitted back to the client side as possible topic matches.

So, in operation 626, for each typed character, the text inputted by the user 622 is compared to the topics stored locally on the client side 630, and in operation 628, any possible topic matches are identified. If a match is found between the user 622 inputted character string and one or more locally stored topics 630, the topics are displayed to the user. In exemplary embodiments of the present invention, the matched topics may be displayed in drop down menu from which the user may select the topic he or she desires.

If no match is found between the character string inputted by the user, the process continues in operation 624, where the system reads the next character inputted by the user.

In operation 626, if no local topics are found that match the user inputted text, the client transmits the user typed text to the server side for a server side (remote) matching of the typed text to the database of topics and categories 610.

In operation 636, the user may remove or delete a character. The removal of a character causes the process to continue in operation 638, where if the typed text is smaller than the last server call, the user typed text triggers the transmission of the user typed text to for server side topic matching.

Alternatively, if the removal of character does not result in a text that is shorter than the last client-server text transmission, the shortened character string is compared to the locally stored topics 630, in operation 626.

Figure 7:
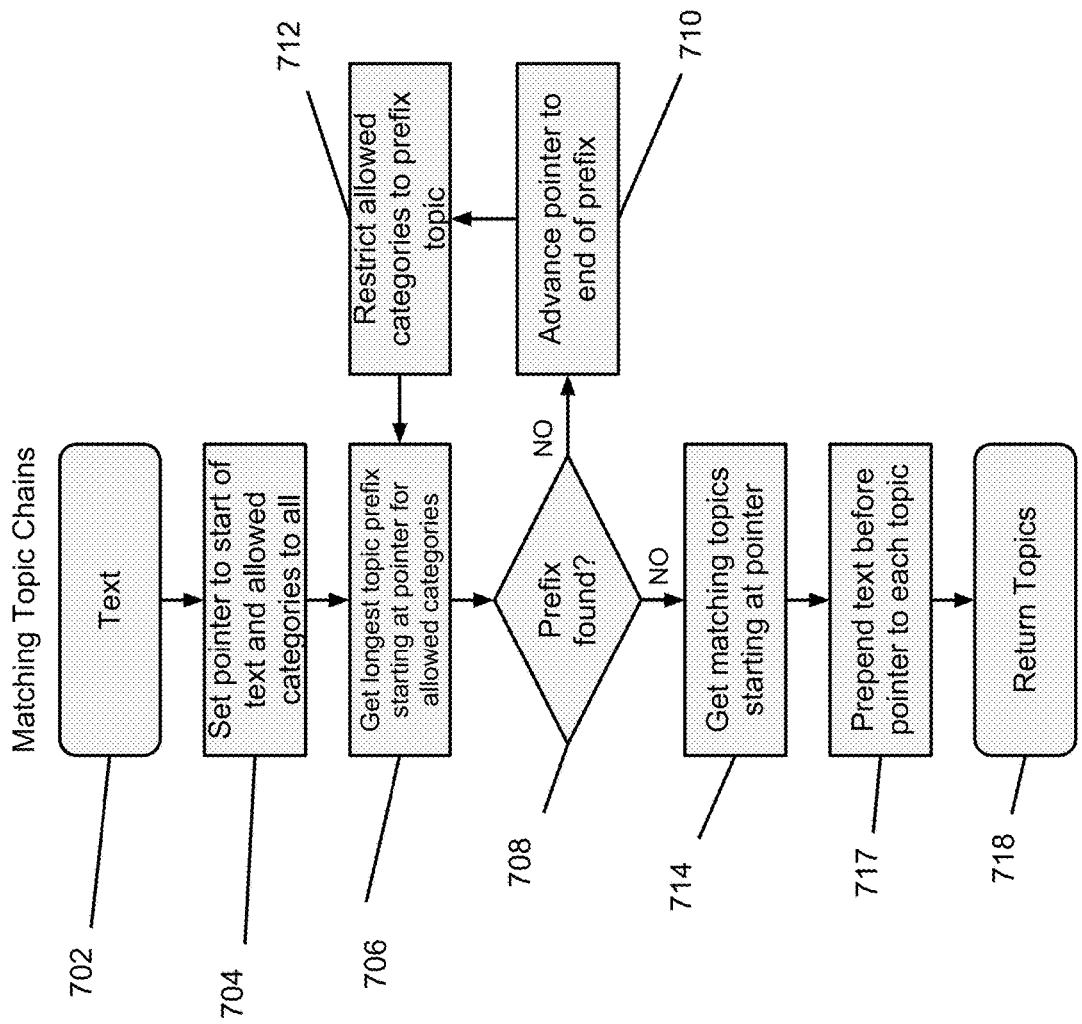
FIG. 7 shows a simplified block diagram of a digital device within which a set of instructions, for causing the machine to perform any one or more of the methodologies discussed herein, may be executed.

FIG. 7 describes an exemplary embodiment of a process of multi-subject explicit topic extraction. The exemplary process shown in FIG. 7 starts at operation 702 with the reading the user text input that presumably contains the user desired explicit topic.

In operation 704, a text pointer is set to the start of the text. The pointer is set to the beginning of the text to begin the search for topics from the beginning of the character string. Additionally, in the most general case, where no original question was selected, the user is entering the topics with no indication of any desired category; the allowed category value is set to "all categories." So, for example, if a user types the character string "golden retriever hip", the text pointer is set at the beginning of the string and the allowed category value is not limited to the apparent subject categories of pets, dogs or veterinary medicine. It would be apparent that in a different context for example, where an "original question" was selected, and the user was adding explicit topics somewhat related to the subject matters present in the "original question", the allowed category value may be limited to the selected categories of interest.

In operation 706, the longest topic prefix is selected and analyzed to see if the topic prefix matches any topics in the prefix tree 610. In the case of the above example, "golden retriever" is the longest the topic prefix that may yield a topic match. Since the allowed categories value was set to "all categories", topics matches in every category is identified.

In operation 708, the system checks to see if a prefix was found. If a prefix is found, the process continues in operation 710 where the text pointer is set to the end of the longest topic prefix.

In operation 712, based on the matched prefix, the categories value is restricted to allow matching only within categories related to the previously identified longest prefix topic.

The process continues in operation 706, with the next longest prefix topic being selected for matching. However, the search for a match for the next longest prefix topic is done only within the restricted/allowed number of categories. So, in the above example, the remaining text after "golden retriever" is "hi" and when the system looks for a match for "hi" in only the categories corresponding to the topic "golden retriever" which is likely to be veterinary medicine, pets, dogs, etc.

The process continues in operation 714, if a match was not identified in the previous step 708. In operation 714, the topics from the prefix tree 610 that match the text after the found prefix topics are selected. So, with 'golden retriever hi" example above, any topics matching the text string after the pointer such as "hi xxxxx," (e.g. "hip replacement", "hip problems", "hit by car", etc.) would be selected.

In operation 716, the text before the text pointer is prepended to the identified matched topics to create the relevant multi-subject topic string. For example, as the user is typing "golden retriever hi," the system prepends "golden retriever" (the prefix) to any matching topics forming multi-subject topics for "hi" such as "golden retriever hip problem" and "golden retriever hip replacement." The multi-subject topic strings would appear in an appropriate window for the user to select from. In one exemplary embodiment of the present invention, the matched topics may be displayed in the "related feeds" window 208 of FIG. 2A. The user may add one or more of the displayed matched topics as an explicit topic to create an information feed related to by clicking the add button 210 as shown in FIG. 2A.

Modules, Components, and Logic

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry or in temporarily configured circuitry (e.g., configured by software) may be driven by, for example, cost, time, energy-usage, and package size considerations.

Accordingly, the term module or engine should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Exemplary Machine Architecture and Machine-Readable Medium

Figure 8:
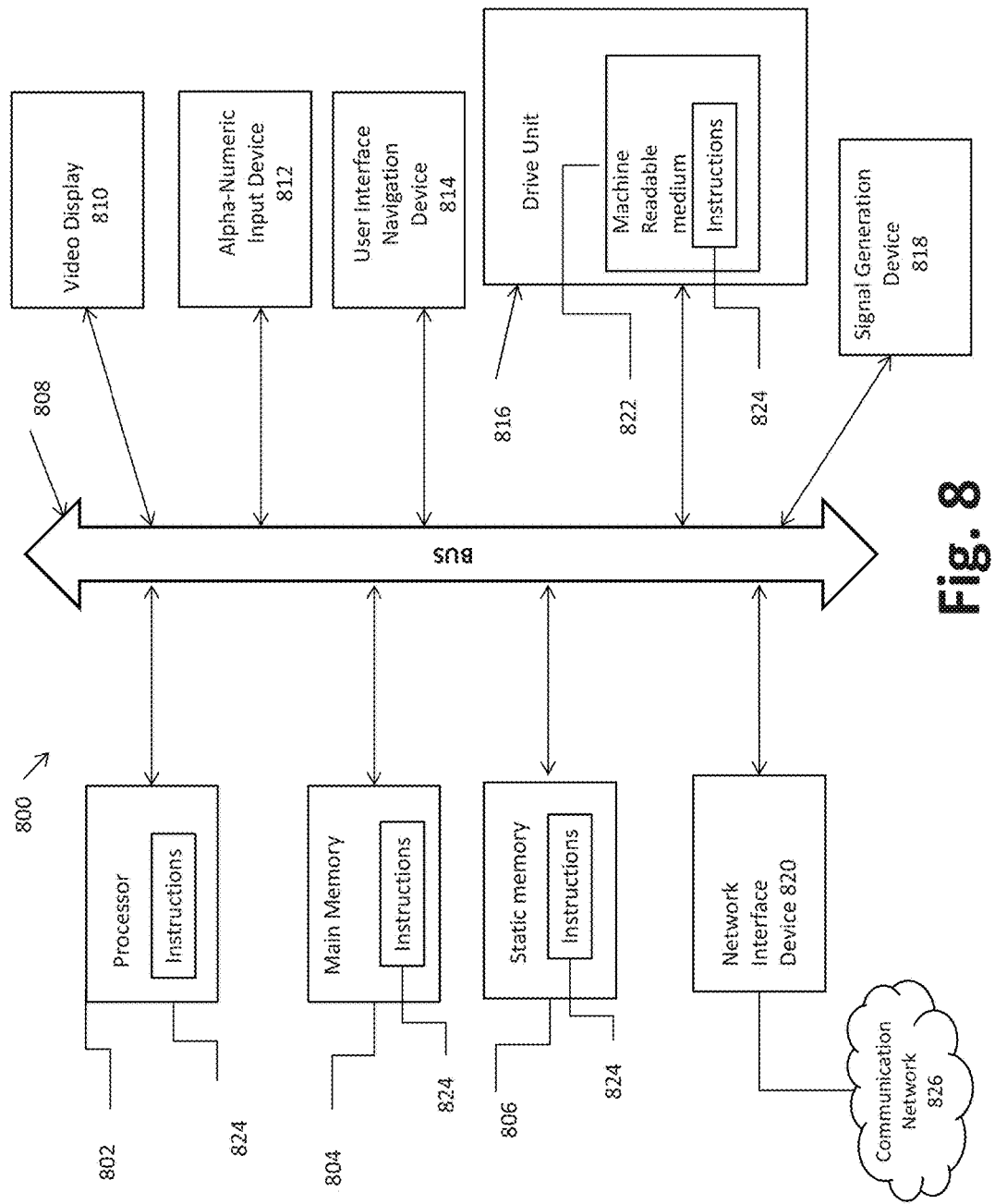
FIG. 8 shows a simplified block diagram of a digital device within which a set of instructions, for causing the machine to perform any one or more of the methodologies discussed herein, may be executed.

With reference to FIG. 8, an exemplary embodiment extends to a machine in the exemplary form of a computer system 800 within which instructions for causing the machine to perform any one or more of the methodologies discussed herein may be executed. In exemplary embodiments, the computer system 800 may be any one or more of the user client 106, the expert client 108, affiliate system 110, and servers of the consultation system 102. In alternative exemplary embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 may include a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). In exemplary embodiments, the computer system 800 also includes one or more of an alpha-numeric input device 812 (e.g., a keyboard), a user interface (UI) navigation device or cursor control device 814 (e.g., a mouse), a disk drive unit 816, a signal generation device 818 (e.g., a speaker), and a network interface device 820.

Machine-Readable Medium

The disk drive unit 816 includes a machine-readable medium 822 on which is stored one or more sets of instructions 824 and data structures (e.g., software instructions) embodying or used by any one or more of the methodologies or functions described herein. The instructions 824 may also reside, completely or at least partially, within the main memory 804 or within the processor 802 during execution thereof by the computer system 800, the main memory 804 and the processor 802 also constituting machine-readable media.

While the machine-readable medium 822 is shown in an exemplary embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable medium" shall accordingly be taken to include, but not be limited to, solid-state memories and optical and magnetic media. Specific examples of machine-readable media include non-volatile memory, including by way of exemplary semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks. The term "machine-readable medium" shall also be taken to include any non-transitory storage medium.

Transmission Medium

The instructions 824 may further be transmitted or received over a communications network 826 using a transmission medium via the network interface device 820 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific exemplary embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the exemplary configurations may be implemented as a combined structure or resource. Similarly, structures and functionality presented as a single resource may be implemented as separate resources.

These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A computer implemented method, comprising:
   identifying a plurality of topics and categories from a plurality of sources, the plurality of sources including:
   topic and category clusters for use with search engine optimization, and
   implicitly extracted topics from historic question data;
   scoring the plurality of topics and the plurality of categories;
   creating a prefix tree, utilizing the scored plurality of topics and the scored plurality of categories;
   receiving a selection of a saved question relevant to an Internet search engine query submitted by a visitor;
   identifying and extracting a plurality of implicit topics within the saved question;
   displaying the saved question, the plurality of implicit topics, and an explicit topic field to the visitor, utilizing a processor;
   receiving from the visitor textual input indicating an explicit topic of interest in the explicit topic field;
   setting a pointer to a beginning of the textual input;
   setting an allowed category value to a predetermined setting;
   identifying a plurality of topic prefixes within the textual input;
   selecting a first topic prefix, the first topic prefix having a greatest length from the plurality of topic prefixes;
   identifying from within the prefix tree one or more categories containing a match for the first topic prefix;
   setting the pointer to the end of the first topic prefix within the textual input;
   restricting the allowed category value to the one or more categories containing the match for the first topic prefix;
   selecting a second topic prefix, the second topic prefix having a second greatest length from the plurality of topic prefixes;
   identifying from within the prefix tree one or more matching topics for the second topic prefix within the one or more categories containing the match for the first topic prefix;
   modifying the one or more matching topics by prepending all of the textual input prior to the pointer to each of one or more matching topics; and
   displaying to the visitor a content feed consisting of the one or more modified matching topics, where the content feed includes questions previously submitted to the online consultation system that include the plurality of implicit topics as well as the one or more modified matching topics.

2. The method of claim 1, further comprising: allowing the visitor to modify the content feed by adding or deleting implicit topics of interest and explicit topics of interest.

3. The method of claim 1, further comprising: allowing the visitor to customize a font size of characters of the content feed, and the height and width of a display window of the content feed in order to display more or less of the content feed.

4. The method of claim 1, wherein an explicit topics of interest suggestion list displayed to the visitor is revised in real-time as the visitor inputs new characters.

5. The method of claim 4, further comprising:
   for each new character inputted by the visitor in spelling the explicit topic of interest in the explicit topic field, regenerating the explicit topics of interest suggestion list based on the new character.

6. An apparatus comprising one or more hardware processors for:
   identifying a plurality of topics and categories from a plurality of sources, the plurality of sources including:
   topic and category clusters for use with search engine optimization, and
   implicitly extracted topics from historic question data;
   scoring the plurality of topics and the plurality of categories;
   creating a prefix tree, utilizing the scored plurality of topics and the scored plurality of categories;
   receiving a selection of a saved question relevant to an Internet search engine query submitted by a visitor;
   identifying and extracting a plurality of implicit topics within the saved question;
   displaying the saved question, the plurality of implicit topics, and an explicit topic field to the visitor;
   receiving from the visitor textual input indicating an explicit topic of interest in the explicit topic field;
   setting a pointer to a beginning of the textual input;
   setting an allowed category value to a predetermined setting;
   identifying a plurality of topic prefixes within the textual input;
   selecting a first topic prefix, the first topic prefix having a greatest length from the plurality of topic prefixes;
   identifying from within the prefix tree one or more categories containing a match for the first topic prefix;
   setting the pointer to the end of the first topic prefix within the textual input;

restricting the allowed category value to the one or more categories containing the match for the first topic prefix;

selecting a second topic prefix, the second topic prefix having a second greatest length from the plurality of topic prefixes;

identifying from within the prefix tree one or more matching topics for the second topic prefix within the one or more categories containing the match for the first topic prefix;

modifying the one or more matching topics by prepending all of the textual input prior to the pointer to each of one or more matching topics; and displaying to the visitor a content feed consisting of the one or more modified matching topics, where the content feed includes questions previously submitted to the online consultation system that include the plurality of implicit topics as well as the one or more modified matching topics.

7. The apparatus of claim 6, further comprising one or more hardware processors for:

for each new character inputted by the visitor in spelling the explicit topic of interest in the explicit topic field, regenerating the explicit topics of interest suggestion list based on the new character.

8. A non-transitory machine-readable storage medium having embodied thereon instructions which when executed by at least one processor, causes a machine to perform operations comprising:

identifying a plurality of topics and categories from a plurality of sources, the plurality of sources including:
topic and category clusters for use with search engine optimization, and
implicitly extracted topics from historic question data;

scoring the plurality of topics and the plurality of categories;

creating a prefix tree, utilizing the scored plurality of topics and the scored plurality of categories;

receiving a selection of a saved question relevant to an Internet search engine query submitted by a visitor;

identifying and extracting a plurality of implicit topics within the saved question;

displaying the saved question, the plurality of implicit topics, and an explicit topic field to the visitor, utilizing a processor;

receiving from the visitor textual input indicating an explicit topic of interest in the explicit topic field;

setting a pointer to a beginning of the textual input;

setting an allowed category value to a predetermined setting;

identifying a plurality of topic prefixes within the textual input;

selecting a first topic prefix, the first topic prefix having a greatest length from the plurality of topic prefixes;

identifying from within the prefix tree one or more categories containing a match for the first topic prefix;

setting the pointer to the end of the first topic prefix within the textual input;

restricting the allowed category value to the one or more categories containing the match for the first topic prefix;

selecting a second topic prefix, the second topic prefix having a second greatest length from the plurality of topic prefixes;

identifying from within the prefix tree one or more matching topics for the second topic prefix within the one or more categories containing the match for the first topic prefix;

modifying the one or more matching topics by prepending all of the textual input prior to the pointer to each of one or more matching topics; and displaying to the visitor a content feed consisting of the one or more modified matching topics, where the content feed includes questions previously submitted to the online consultation system that include the plurality of implicit topics as well as the one or more modified matching topics.

9. The non-transitory machine-readable storage medium of claim 8, further having embodied thereon instructions which when executed by the at least one processor, causes the machine to perform operations comprising:

for each new character inputted by the visitor in spelling the explicit topic of interest in the explicit topic field, regenerating the explicit topics of interest suggestion list based on the new character.

* * * * *